United States Patent Office 3,480,625
Patented Nov. 25, 1969

3,480,625
DIOXAZINE DYESTUFFS HAVING IN 6 AND 13 POSITION A HETEROCYCLIC ACYLAMINO GROUP
Karl Ronco, Riehen, and Istvan Hari, Basel, Switzerland, assignors to Ciba Limited, Basel, Switzerland, a company of Switzerland
No Drawing. Filed Jan. 17, 1967, Ser. No. 609,744
Claims priority, application Switzerland, Jan. 25, 1966, 940/66
Int. Cl. C09b *19/02;* C07d *87/48*
U.S. Cl. 260—246               6 Claims

ABSTRACT OF THE DISCLOSURE

The present invention concerns pigment dystuffs of the triphendioxazine series. They are characterized by the presence in each of the 6 and 13 positions of an acylamino group which is derived from a heterocyclic carboxylic acid, especially a pyridine or thiophene carboxylic acid.

*Use.*—For coloring high molecular organic products, such as plastics and lacquers.

---

The present invention is based on the observation that new, valuable dioxazine dyestuffs of the formula (1)

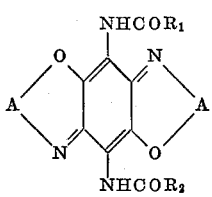

in which A represents an ortho-arylene residue, $R_1$ represent a heterocyclic residue and $R_2$ represents a heterocyclic residue or an aryl residue, can be obtained when a 3,6-bis-(aroylamino)-1,4-benzoquinone of the formula

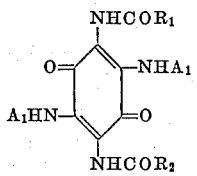

in which $R_1$ and $R_2$ have the meanings given above and $A_1$ represents an aryl residue preferably containing an ether group in ortho-position to the —NH— group, is subjected to ring-closure with the formation of a dioxazine.

The 3,6-bis-(aroylamino)-1,4-benzoquinones used as starting materials preferably correspond to the formula (2)

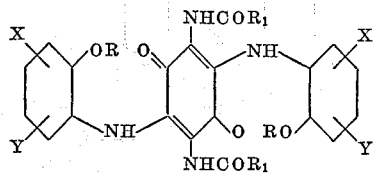

in which $R_1$ represents a heterocyclic residue, R represents an alkyl or an aryl residue, X represents a hydrogen or a halogen atom or an alkyl, alkoxy, aralkoxy, aryloxy, carbalkoxy, carbophenoxy, nitro, cyano, acylamino, trifluoromethyl, alkylsulphonyl, arylsulphonyl, aryl, alkylmercapto or arylmercapto group and Y represents a hydrogen or a halogen atom or an alkyl, alkoxy or nitro group.

The 3,6-bis-(aroylamino)-1,4-benzoquinones may advantageously be prepared by condensing one mol of a parabenzoquinone of the formula (3)

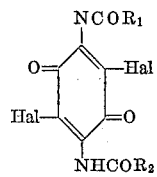

with two mols of an arylamine containing an ether group in ortho-position to the amino group, especially an ortho-alkoxy- or an ortho-phenoxyaminobenzene. The following arylamines may be mentioned as examples:

1-amino-2-methoxybenzene,
1-amino-2,3-diethoxybenzene,
1-amino-2,4-dimethoxybenzene,
1-amino-2,4-diethoxybenzene,
1-amino-2,4-diphenoxybenzene,
1-amino-2,5-diphenoxybenzene,
1-amino-2,4-diethoxy-5-chlorobenzene,
1-amino-2,4-diphenoxy-5-chlorobenzene,
1-amino-2,5-dimethoxybenzene,
1-amino-2,5-diethoxybenzene,
1-amino-2-methoxy-3-methylbenzene,
1-amino-2-methoxy-4-methylbenzene,
1-amino-2-methoxy-5-methylbenzene,
1-amino-2-methoxy-3-chlorobenzene,
1-amino-2-methoxy-4-chlorobenzene,
1-amino-2-methoxy-5-chlorobenzene,
1-amino-2-methoxy-4-nitrobenzene,
1-amino-2-methoxy-5-benzoylbenzene,
1-amino-2-methoxy-5-acetylbenzene,
1-amino-2-methoxy-4-cyanobenzene,
1-amino-2-methoxy-5-methylsulphonylbenzene,
1-amino-2-methoxy-5-phenylsulphonylbenzene,
1-amino-2-methoxy-5-phenylbenzene,
1-amino-2-methoxy-5-trifluoromethylbenzene,
1-amino-2-methoxy-5-carbalkoxybenzene,
1-amino-2-methoxy-5-carbophenoxybenzene,
1-amino-2-methoxy-4-acetylaminobenzene,
1-amino-2-methoxy-4-benzoylaminobenzene,
1-amino-2,5-dimethoxy-4-acetylaminobenzene,
1-amino-2,5-dimethoxy-4-benzoylaminobenzene,
1-amino-2,5-diethoxy-4-benzoylaminobenzene,
1-amino-2-methoxy-4-benzoylamino-5-methylbenzene,
1-amino-2-methoxy-4-benzoylamino-5-chlorobenzene,
1-amino-2-methoxy-5-benzoylaminobenzene,
1-amino-2-methoxy-naphthalene and
2-amino-1-methoxynaphthalene.

The heterocyclic residue $R_1$ in the compounds of the Formulae 1 to 3 is preferably a monocyclic heterocyclic residue. The following carboxylic acids containing a heterocyclic residue $R_1$ may be mentioned as examples:

furan-2-carboxylic acid, thiophene-2-carboxylic acid,
2-carbomethoxythiophene-5-carboxylic acid,
2-phenylthiophene-5-carboxylic acid,
pyridine-2-carboxylic acid,
pyridine-3-carboxylic acid,
pyridine-4-carboxylic acid,
quinoline-2-carboxylic acid,
2-phenylquinoline-4-carboxylic acid,
2-phenylthiazole-4-carboxylic acid and
1-phenyl-1,2,3-triazole-4-carboxylic acid.

Dioxazine ring-closure is advantageously performed at a temperature within the range of from 150 to 200° C. in an inert organic solvent, for example, ortho-dichlorobenzene, trichlorobenzene, nitrobenzene, naphthalene or chloronaphthalene, if desired or required, in the presence of an acid chloride, for example, benzoyl chloride, para-toluenesulphonic acid chloride or thionyl chloride.

To simplify the synthesis, the reaction between the dichlorodiacylamino-1,4-benzoquinone of the Formula 3 and the arylamine and the subsequent ring-closure to form the dioxazine can be carried out in the same vessel without isolation of the intermediate product.

The products obtained are valuable red to blue dyestuffs which are primarily suitable for use as pigments and have a very broad field of application. For example, they can be used in a state of fine division for the spin colouration of filament and staple-fibre viscose, cellulose ethers, cellulose esters, polyamides, polyurethanes and polyesters, in the preparation of coloured lacquers and lake formers, coloured solutions and products made from cellulose acetate, nitrocellulose, natural resins and synthetic resins, for example, polymerization resins or condensation resins, for example, aminoplasts, alkyd resins, phenoplasts, polyolefines, for example, polystyrene, polyvinyl chloride, polyethylene, polypropylene, polyacrlyonitrile, rubber, casein, and silicones and silicone resins. They are also suitable for use in the manufacture of coloured pencils, cosmetic preparations and laminated sheet material.

The following examples illustrate the invention. Unless otherwise stated, the parts and percentages are by weight.

EXAMPLE 1

10.3 parts of 2,5-dibromo-3,6-bis-(2-thiophenoylamino)-1,4-benzoquinone and 7.4 parts of 2,4-diethoxyaniline are heated to 200° C. within 60 minutes in the presence of 6.6 parts of anhydrous sodium acetate in 120 parts of α-chloronaphthalene while stirring. After formation of the dianil, ring-closure to form the dioxazine is carried out directly at 200 to 210° C. for 30 minutes. The uniformly crystalline red pigment which forms is isolated by filtration at 120° C., washed with hot α-chloronaphthalene, methanol, water and methanol, and then dired in vacuo at 60 to 70° C. When used in a state of fine division, it colours PVC film scarlet tints having a very good fastness to migration and to light.

The pigment corresponds to the formula

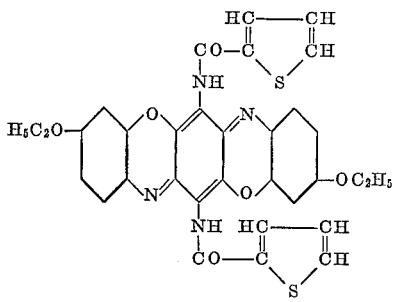

Pigments of a similar tint and possessing similar properties of fastness are obtained when the 2,4-diethoxyaniline is replaced by an equivalent proportion of 2,5-diethoxyaniline, 4-chloro-2,5-diethoxyaniline, 2,4-dimethoxyaniline, 2,4-diphenoxyaniline, 2-phenoxy-5-trifluoromethyl aniline, 2-phenoxy-5-carbethoxyaniline, or 2-phenoxy-5-carbophenoxyaniline, or when the 2,5-dibromo-3,6-bis-(2-thiophenoylamino)-1,4-benzoquinone is replaced by an equivalent proportion of 2,5-dibromo-3,6 - bis-(2-furanoylamino)-1,4-benzoquinone, 2,5-dibromo - 3,6-bis-(nicotinoylamino)-1,4-benzoquinone, 2,5-dibromo-3,6-bis-(isonicotinoylamino)-1,4-benzoquinone or 2,5 - dibromo - 3,6 - bis-(picolinoylamino)-1,4-benzoquinone.

EXAMPLE 2

10.3 parts of 2,5-dibromo-3,6-bis-(2-thiophenoylamino)-1,4-benzoquinone and 13 parts of 2,5-diethoxy-4-benzoylaminoaniline are heated to 200° C. within 60 minutes in the presence of 6.6 parts of anhydrous sodium acetate in 150 parts of α-chloronaphthalene while stirring. After formation of the dianil, ring-closure to form the dioxazine is carried out directly at 200 to 210° C. for 30 minutes. The crystalline, blue pigment which forms is isolated by filtration at 120° C., washed with hot α-chloronaphthalene, methanol, water and methanol and then dreid in vacuo at 60 to 70° C.

The product of the formula

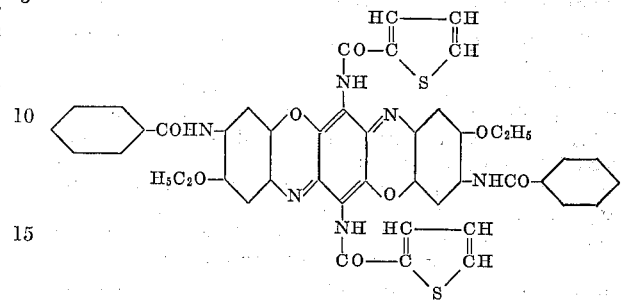

is a reddish blue pigment which is sparingly soluble to insoluble in the common solvents and colours polyvinyl chloride film reddish blue tints possessing a very good fastness to light, to migration and to over-lacquering.

Pigments having colours ranging through red and violet to blue and similar properties of fastness are obtained when the 2,5-diethoxy-4-benzoylaminoaniline is replaced by an equivalent proportion of 2,5-dimethoxy-4-benzoylaminoaniline, 2-methoxy-5-methyl-4-benzoylaminoaniline, 2-methoxy-5-chloro-4-benzoylaminoaniline, 2,5-diethoxy-4 - (4'-chloro)-benzoylaminoaniline, 2,5-diethoxy-4-(4'-methoxy)-benzoylaminoaniline, 2,5 - diethoxy-4-(4'-carbomethoxy)-benzoylaminoaniline, 2,5-diethoxy-4-acetylaminoaniline or 2,5-dimethoxy-4-formylaminoaniline, or when the 2,5-dibromo-3,6-bis-(2-thiophenoylamino)-1,4-benzoquinone is replaced by an equivalent amount of 2,5 - dibromo - 3,6-bis-(2-furanoylamino)-1,4-benzoquinone.

EXAMPLE 3

8.6 parts of 2,5-dichloro-3,6-bis-(2-thiophenoylamino)-1,4-benzoquinone and 7.4 parts of 2,4-diethoxyaniline are heated under the conditions described in Example 1 in the presence of 6.6 parts of anhydrous sodium acetate in 120 parts of α-chloronaphthalene. The reaction product is worked up in a manner analogous to that described in Example 1. It has the same formula as the pigment obtained in the manner described in Example 1.

EXAMPLE 4

10.9 parts of 2,5-dichloro-3,6-bis-(5-carbomethoxy-2-thiophenoylamino)-1,4-benzoquinone and 7.4 parts of 2,4-diethoxyaniline are heated in the manner described in Example 1 in the presence of 6.6 parts of anhydrous sodium acetate in 120 parts of α-chloronaphthalene. The reaction product is worked up in the manner described in Example 1. The new pigment corresponds to the formula

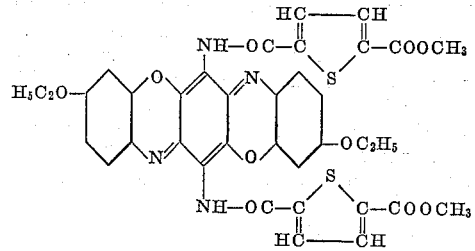

When used in a state of fine division, it colours polyvinyl chloride scarlet tints possessing a good fastness to migration and to light.

A pigment having a similar tint and similar properties of fastness is obtained by replacing the 2,4-diethoxyaniline with an equivalent amount of 2,5-diethoxyaniline.

EXAMPLE 5

9.7 parts of 2,5-dichloro-3,6-bis-(2,4-dimethyl-5-thiazolylamino)-1,4-benzoquinone and 7.4 parts of 2,4-diethoxyaniline are heated in the manner described in Example 1 in the presence of 6.6 parts of anhydrous sodium acetate in 120 parts of α-chloronaphthalene. The pigment of the formula

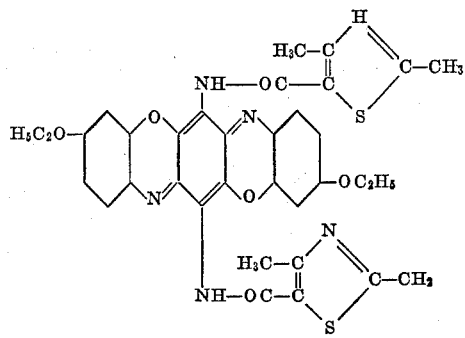

is obtained which colours polyvinyl chloride fast scarlet tints.

EXAMPLE 6

20 parts of 2,5-dinicotinoylamino-3,6-di-(2′,5′-diethoxy-4′ - benzoylaminophenylamino) - 1,4 - benzoquinone, prepared by condensing 2,5-dinicotinoylamino-3,6-dichloro-1,4 - benzoquinone and 1 - amino - 4 - benzoylamino - 2,5 - diethoxybenzene in isopropanol in the presence of sodium acetate, are slowly heated to the boil in 150 parts of ortho-dichlorobenzene, the alcohol split off during closure of the dioxazine ring being removed by distillation. The batch is kept at a gentle boil for 4 hours while stirring, cooled to 120° C., and filtered. Working up is effected in the manner described in Example 2. The pigment so obtained corresponds to the formula

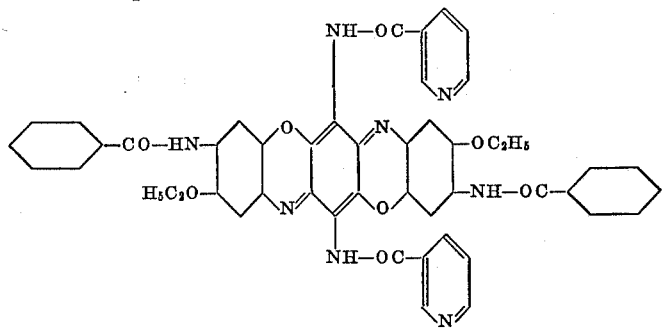

and colours polyvinyl chloride film fast blue tints.

A pigment having similar colouration properties is obtained by using 2,5-dipicolinoyl- or diisonicotinoylamino-3,6 - bis - (2′,5′ - diethoxy - 4′ - benzoylaminophenylamino)-1,4-benzoquinone as starting material.

EXAMPLE 7

9.1 parts of 2,5 - dichloro - 3 - (α-thiophenoylamino)-6 - (2′ - chlorobenzoylamino) - 1,4-benzoquinone and 7.4 parts of 2,4-diethoxyaniline are heated in the manner described in Example 1 in the presence of 6.6 parts of anhydrous sodium acetate in 120 parts of α-chloronaphthalene. The new pigment so obtained corresponds to the formula

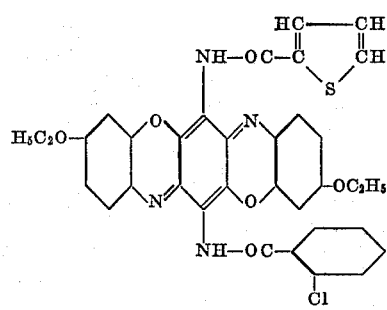

It colours polyvinyl chloride scarlet tints having a very good fastness to migration and to light.

Pigments having a similar tint and similar properties of fastness are obtained when the 2,5-dichloro-3-(2-thiophenoylamino) - 6 - (2′ - chlorobenzoylamino) - 1,4-benzoquinone is replaced by an equivalent amount of 2,5 - dichloro - 3 - (2 - thiophenylamino) - 6 - benzoylamino - 1,4 - benzoquinone, 2,5 - dichloro - 3 - (2-furanoylamino)-6-benzoylamino-1,4-benzoquinone, 2,5-dichloro-3 - (2 - furanoylamino) - 6 - (2′ - chlorobenzoylamino)-1,4 - benzoquinone or 2,5 - dichloro - 3 - (2 - thiophenoylamino) - 6 - (2′,4′ - dichlorobenzoylamino) - 1,4 - benzoquinone.

We claim:

1. A dioxazine dyestuff of the formula

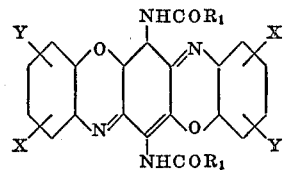

in which $R_1$ represents a heterocyclic radical selected from the group consisting of pyridine, furane, thiophene, picolinyl, 5-carbomethoxy-2-thiophenyl and 2,4-dimethyl-5-thiazolyl, X represents a hydrogen, a halogen lower alkyl, lower alkoxy, phenoxy, nitro, cyano or benzoylamino, 4′ - methoxybenzoylamino, 4′-carbomethoxybenzoylamino and 4′-chlorobenzoylamino and Y represents a hydrogen, a halogen or lower alkyl or lower alkoxy or nitro.

2. The dyestuff as claimed in claim 1 of the formula

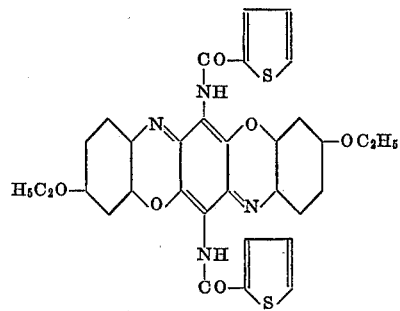

3. The dyestuff as claimed in claim 1 of the formula

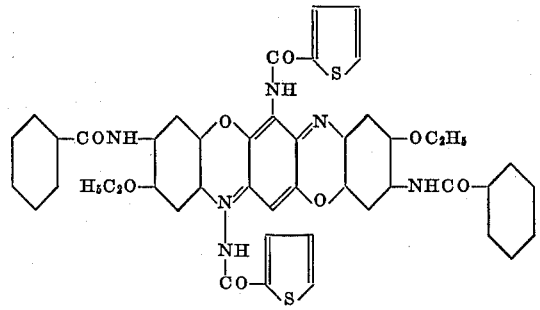

4. The dyestuff as claimed in claim 1 of the formula
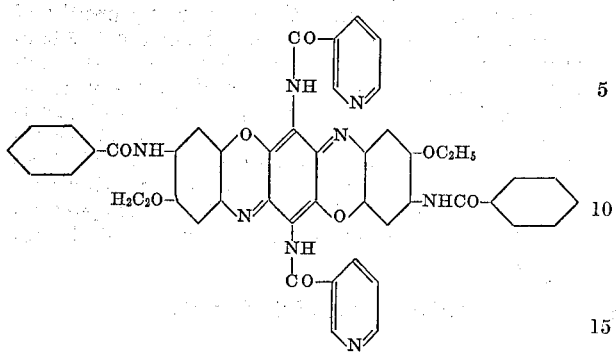
5. The dyestuff as claimed in claim 1 of the formula
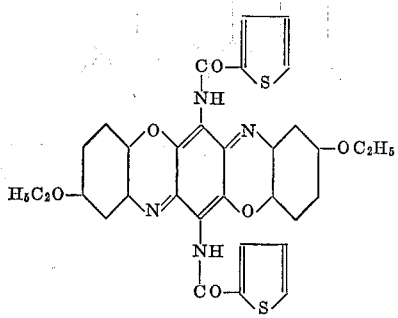
6. The dyestuff as claimed in claim 1 of the formula
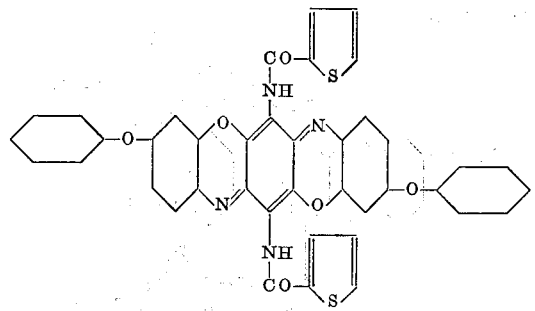
References Cited
UNITED STATES PATENTS
3,065,229  11/1962  Ronco _____ 260—246
FOREIGN PATENTS
1,374,546  8/1964  France.
OTHER REFERENCES
Ciba Chem. Abst., vol. 59, column 5294 (1963).
HENRY R. JILES, Primary Examiner
NATALIE TROUSOF, Assistant Examiner
U.S. Cl. X.R.
260—37, 38, 39, 40, 41, 41.5, 295, 295.5, 308, 332.2, 347.3, 764, 287; 8—3, 4, 5, 57; 106—19, 193, 204

CASE 5855/E

PO-1050
(5/69)

UNITED STATES PATENT OFFICE
CERTIFICATE OF CORRECTION

Patent No. 3,480,625      Dated November 25, 1969

Inventor(s) KARL RONCO ET AL

It is certified that error appears in the above-identified patent and that said Letters Patent are hereby corrected as shown below:

Column 6, lines 63 to 74, amend the middle of the formula to read:

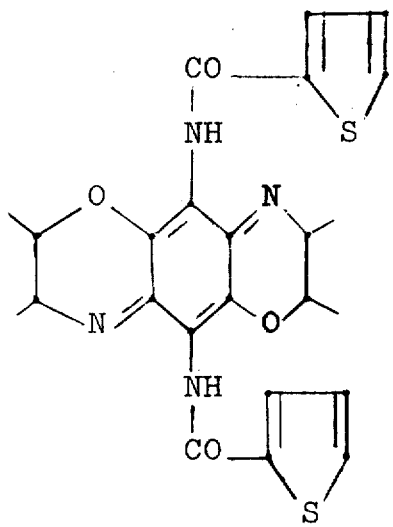

SIGNED AND
SEALED
JAN 5 1971

(SEAL)
Attest:

Edward M. Fletcher, Jr.
Attesting Officer

WILLIAM E. SCHUYLER, JR.
Commissioner of Patents